INVENTORS
DAVID LEVOWITZ
MAURICE WEBER
BY Robert A. Green
ATTORNEY

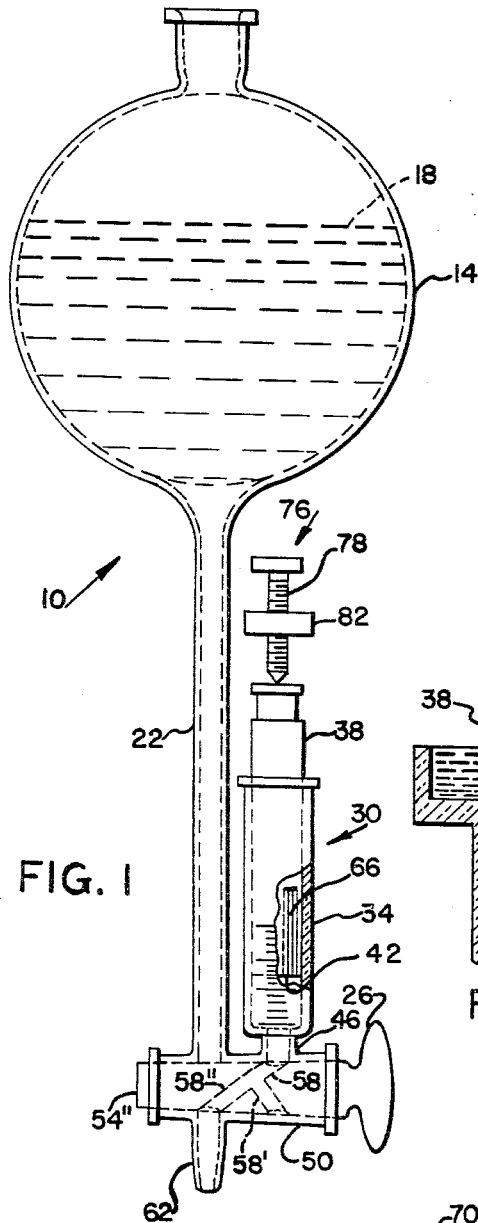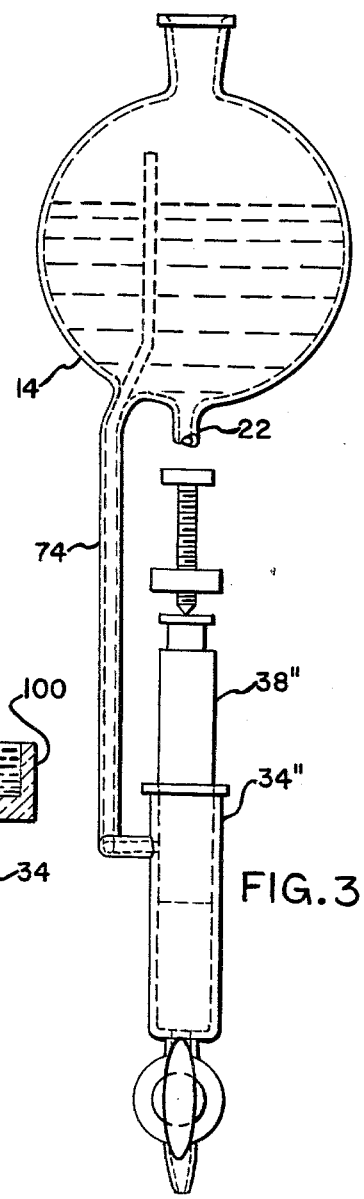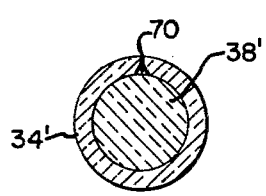

United States Patent Office 3,250,441
Patented May 10, 1966

3,250,441
LIQUID-DISPENSING APPARATUS
David Levowitz, 8 Hamlin Road, Highland Park, N.J., and Maurice Weber, 314 Montgomery St., Highland Park, N.J.
Continuation of application Ser. No. 204,422, Jan. 22, 1962. This application Dec. 28, 1964, Ser. No. 423,639
20 Claims. (Cl. 222—309)

This invention relates to automatic liquid-metering apparatus and, particularly, to automatic metering apparatus suitable for use in laboratories and capable of dispensing, rapidly and accurately, measured quantities of corrosive and non-corrosive liquids.

This application is a continuation of application Serial No. 204,422, filed June 22, 1962, now abandoned.

Pipettes and burettes are the laboratory apparatus commonly used for accurately dispensing measured quantities of liquids. These pieces of apparatus are calibrated to contain specified volumes to graduated marks, and liquid flows by gravity from their outlets. Whereas the bulk of the liquid being measured out may leave the apparatus rapidly, a portion of it, adsorbed on the interior walls, drains slowly so that accurate transfer of measured volumes requires a prolonged drainage time.

Automatic pipettes and burettes, which are filled from reservoirs either by gas pressure or by gravity, increase the rate at which accurately measured volumes of liquid may be dispensed by decreasing the length of time taken to refill them. However, here too, accurate and complete transfer is not accomplished until liquid drains completely from the walls of the apparatus, and even these automatic devices are slow-acting.

Syringes consisting of pistons articulating in barrels have also been employed as accurate liquid-metering devices. The piston's displacement of liquid from the barrel's walls permits the accurate transfer of measured volumes without losing time awaiting complete drainage. For syringes to transfer liquid volumes accurately, all air must be removed from them. In handling syringes manually, it is standard practice to insert the tip of the syringe into liquid and draw up the piston; this will introduce the air of the tip and some liquid into the barrel. The syringe is now inverted to bring the tip above the barrel. By pushing the piston into the barrel, the entrapped air is discharged. The syringe tip is then re-inserted into liquid, and the syringe may then be filled completely with liquid with no air being present.

Automatic liquid-metering devices employing syringes are standard laboratory items. In some of these, syringes are mounted with their tips "up." Such an arrangement permits "priming" (removing unwanted air) quite conveniently. In these devices, however, elaborate valve systems are required, and these increase the cost of the apparatus. A particular disadvantage in such devices arises from the fact that pressure on the piston must be applied from below. This is troublesome, since the natural motion of the user is to exert pressure from above. In addition, during periods of disuse, liquid may drain out of the syringe between the piston and barrel. When corrosive liquids are involved, such leakage is both inconvenient and dangerous.

Most automatic liquid-metering devices employing syringes are mounted with their tips "down," and much manipulation is required to "prime" them. This manipulation, as well as the cost of these items has prevented automatic liquid-metering equipment employing syringes from coming into general laboratory use. When corrosive liquids are handled, manipulation is attended by danger to the operator.

The principles and objects of the invention are directed toward the provision of an improved automatic liquid-dispensing apparatus which is adapted to provide rapid and complete dispensing of exact quantities of liquids with substantially no drainage time required.

Briefly, the apparatus of the invention comprises a reservoir of fluid to be dispensed coupled to a syringe for dispensing the fluid. The syringe includes a cylinder and an accurately fitting piston within the cylinder. Means are provided for coupling the syringe both to the reservoir and to a dispensing conduit. When the syringe is coupled to the reservoir, it is filled therefrom; when it is coupled to the dispensing conduit, the fluid in the syringe is dispensed through the conduit. In order to insure the dispensing of exact quantities of fluid, means are provided for venting and removing air from the vicinity of the fluid to be dispensed. This means, according to the invention, comprises different arrangements of venting grooves and slots in the component parts of the syringe itself.

The invention is described in greater detail by reference to the drawing wherein:

FIG. 1 is a front elevational view of a first embodiment of the invention;

FIG. 2 is a plan view, partly in section, of a modification of a portion of the invention;

FIG. 3 is a side elevational view of another modification of a portion of the invention;

FIG. 4 is an elevational view of another form of the invention;

Figure 5:
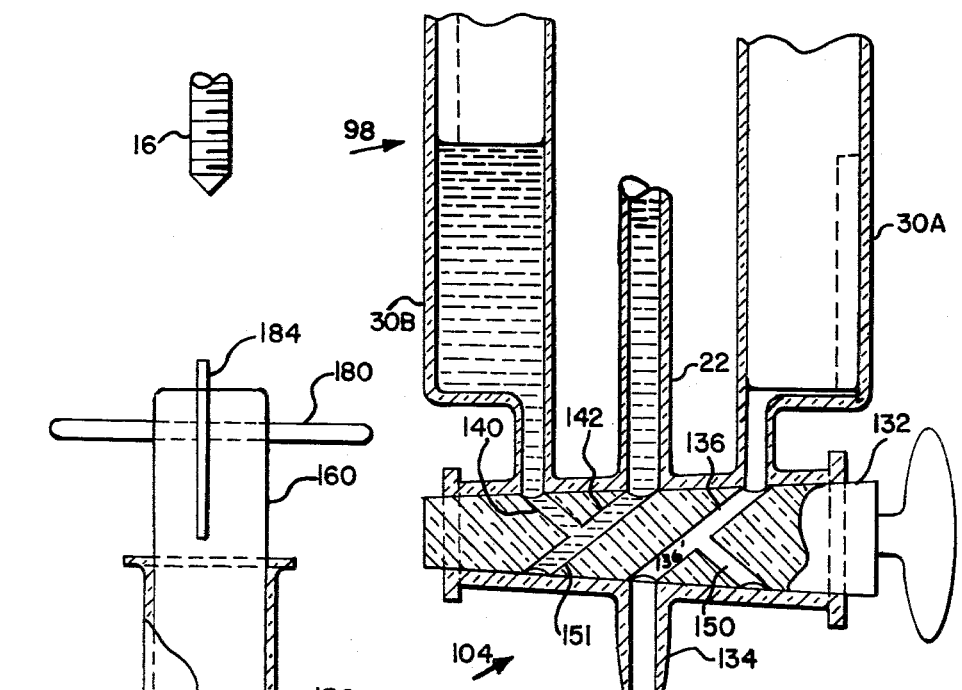
FIG. 5 is a front elevational view of another modification of the invention.

Automatic liquid-metering apparatus 10 shown in FIG. 1 includes a reservoir 14 containing fluid 18 to be dispensed. A small-diameter, elongated discharge tube 22 extends vertically downwardly from the lower end of the reservoir. The discharge tube terminates in a two-position valve or stop-cock 26 to be described in detail below. The metering apparatus 10 also includes a syringe-like dispensing means 30 which comprises a high precision cylinder or barrel 34 and a high precision piston 38 which forms a close and tight fit with the cylinder and is slidable therein. The piston has a leading face or lower end 42. The axis of the syringe extends vertically up and down. The cylinder of the syringe includes at its lower end an inlet-outlet conduit 46 which is coupled to the two-position valve 26. If desired, the cylinder of the syringe may be provided with volume markings.

The two-position valve 26 is oriented horizontally and includes a housing 50 in which a truncated cone control member 54 is rotatably positioned. The control member 54 is solid except for two channels formed therein, one being made up of two parts 58 and 58', and the other being made up of two parts 58 and 58''. In one position of the control member, the channel parts 58 and 58' provide communication between the tube and the cylinder, and, in the other position of the member, the channel parts 58 and 58'' provide a communication between the syringe cylinder 34 and the atmosphere through a suitable dispensing conduit 62.

Stop means 76 is provided, suitably supported with respect to the syringe, for adjustably and controllably limiting the upward movement of the piston 38 in the cylinder 34. One suitable stop means comprises an adjustable screw 78, positioned above the piston and aligned therewith. The screw is held by a nut or any suitable threaded member 82 which is secured to any suitable support means, for example, a support post (not shown) mounted adjacent to the metering apparatus 10. The reservoir and the syringe may also be coupled to the support post by suitable clamps or brackets. The stop 76 may also be clamped to the cylinder 34 itself or to any other suitable support.

According to the invention, means are provided for venting the cylinder 34 of the syringe 30 so that any air trapped in the apparatus may be removed before measured quantities of fluid are to be dispensed. According to one embodiment of the invention, shown in FIG. 1, the venting means comprises a shallow, longitudinal groove 66 formed in the piston 38 and extending upwardly from its lower end 42 along perhaps one-quarter of its length. The length of the vent groove 66 is not critical but is designed for convenience in operating the apparatus in the manner described below. Alternatively, as shown in FIG. 2, the piston 38' may be solid and the cylinder 34' may be provided with a venting groove 70 which extends longitudinally downwardly from the upper end thereof toward the lower end for approximately one-quarter of the length of the cylinder. Here, too, the length of the vent groove is designed to provide maximum ease of operation of the apparatus. In still another arrangement for venting the cylinder, shown in FIG. 3, a tube 74 is connected between the upper end of the cylinder 34" and the reservoir 14, the tube 74 preferably entering the reservoir above the supply of liquid contained therein. The tube 74 enters the cylinder 34" at a level suitable to allow the lower end of piston 38" to be raised to it, whereby venting may be achieved. This arrangement is particularly suited for use with corrosive fluids. The operation of the various venting means are described below.

In a modification of the invention which may be employed with either of the venting means shown in FIGS. 1 and 2, referring to FIG. 4, the upper end of the syringe cylinder 34 is provided with a reservoir cup 100 which is utilized in venting the cylinder. The cup is adapted to retain a quantity of fluid and is deep enough so that the piston 38 may be raised to such a level that its lower end 42 is in the cup and venting is thus accomplished with or without a venting groove. In addition to serving as a vent means, the fluid reservoir also provides constant lubrication for the syringe piston 38.

In operation of the invention, when the apparatus 10 is placed in use for the first time after a period of inactivity, the valve 26 is manually adjusted so that the syringe 30 communicates with the reservoir 14 through the channel 58–58' in the valve cylinder and fluid enters the cylinder 34 from the reservoir. Usually some air also enters cylinder 34. The piston 38 is pushed upwardly by the entering fluid and air. To remove the air, the piston is raised slowly, manually, until the vent groove in the piston communicates with the atmosphere. At this time, any air present between the end of the piston and the fluid in the cylinder is removed through the vent and a known, exact quantity of fluid remains in the cylinder. The stop screw 78 is then adjusted to control the vertical travel of the piston and thereby to control exactly the amount of fluid which enters the cylinder on each cycle of operation. To dispense the fluid from the syringe 30, the valve cylinder 54 is turned to the position in which the channel 58–58" provides communication between the syringe and the dispensing conduit 62. With the valve thus oriented, the fluid flows out of the syringe cylinder 34, with the piston providing fast and complete emptying of the syringe. Since the flow is gravity controlled, the discharge from the conduit 62 is gentle and no violence or agitation occurs in the dispensed fluid. After the syringe has been emptied, the valve 26 is reversed so that communication is provided between the syringe and the reservoir and the desired exact quantity of fluid is fed into the syringe, with no air being able to enter. The fluid is then dispensed as above. This cycle is repeated as often as required.

It will be clear to those skilled in the art that, if the venting means shown in FIG. 2 is employed wherein the venting groove is in the syringe cylinder, then the trapped air may be removed in substantially the same manner as described above. If the venting means of the type shown in FIG. 3 is employed, again the venting operation will be clear to those skilled in the art. If the fluid reservoir cup 100 is employed with the venting means of FIGS. 1 or 2, then the trapped air will escape through the reservoir.

In a normal dispensing operation for the apparatus of FIGS. 1 and 2, the parts are dimensioned and stop 78 is set so that the fluid entering the cylinder does not communicate with the atmosphere through either slot 66 in the piston or slot 70 in the cylinder.

The embodiment of the invention described above may be defined as a half-cycle dispenser, that is, fluid is dispensed during one-half of the cycle of operation of the two-way valve. A modification of the invention shown in FIG. 5 may be defined as a full-cycle dispenser, that is, fluid is dispensed each time that the valve means is manipulated. The apparatus 98 shown in FIG. 5 comprises, essentially, two syringes 30A and 30B of the type shown in FIG. 1 coupled to fluid supply reservoir 14 by a special horizontal valve 104. The valve 104 has a rotatable truncated cone control member 132 and discharge conduit 134. The rotatable member 132 contains a first channel having aligned portions 136–136' oriented to provide communication between the syringe 30A and the conduit 134. This same orientation of the valve member 132 provides channel portions 140–142 which communicate between the syringe 30B and the discharge tube 22 of the reservoir 14. In its reverse orientation, the valve member 132 includes channel portions 136–150 which provide communication between syringe 30A and the reservoir tube 22. This same orientation of the valve provides aligned channels 136–136' which allow communication between the syringe 30A and the valve outlet 134. The apparatus is operated, generally, in the same way as the apparatus 10 of FIG. 1. In operation of the apparatus, after the venting operation has been performed in both syringes, in one position of the valve, fluid is dispensed from one of the syringes through the discharge conduit. At the same time, fluid flows from the reservoir into the other syringe. When the valve is reversed, the fluid in the filled syringe is dispensed and, at the same time, fluid from the reservoir fills the second syringe.

Figure 6:
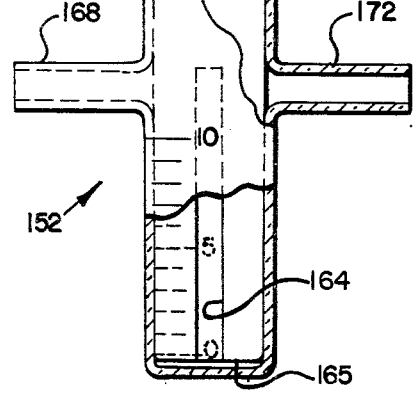
FIG. 6 is an elevational view of another modification of the invention.
Figure 7:
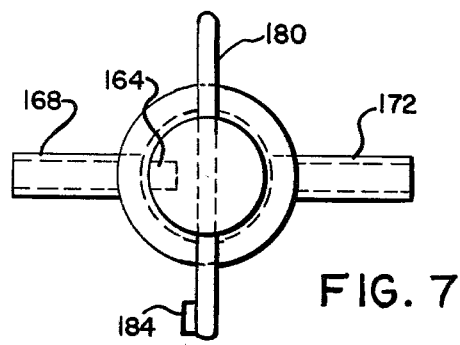
FIG. 7 is a plan view of the apparatus of FIG. 6.

Another embodiment of the invention shown in FIGS. 6 and 7 includes a syringe 152 comprising a barrel 156 and a cylindrical piston 160 adapted to operate within the barrel in conventional fashion. The cylindrical piston 160 is provided with a vertical channel 164 which extends upwardly from its bottom end 165 to any convenient height which may be approximately one-third or one-half of the length of the piston. The channel 164 is of a depth sufficient to permit the flow of liquid at some desired rate. The barrel 156 is provided with an inlet tube 168 which is aligned with the upper end of the channel 164 in the piston. The cross-sectional area of the inlet tube is preferably approximately equal to the horizontal cross-sectional area of the slot. In addition, the upper end of the channel should not be at a higher level than the uppermost point of the inlet tube.

The barrel 156 is also provided with an outlet tube 172 which is aligned on the same horizontal axis as the inlet tube and may be spaced from the inlet tubing by any convenient arc length. However, the arc length between the inlet and outlet tubes should be, at the least, slightly greater than the width of the channel 164. With such an arrangement, the piston can be rotated to bring the channel into alignment with each tube 168 and 172 separately.

The inlet tube 168 may be coupled to a source of fluid to be dispensed (not shown), and this source may be of any suitable type, for example, it may be of the gravity type, in which case, the source would be disposed above the syringe and the inlet tubing would extend upwardly thereto. Alternatively, the fluid source may comprise a source of fluid under pressure, with the inlet tubing 168 suitably coupled thereto.

Any suitable stop means, for example, stop means 16 of the type described above, may be provided for limiting the vertical movement of the syringe piston 160. In addition, stop means are also provided for controlling the rotation of the piston so that the slot 164 in the piston may be aligned accurately and automatically with the inlet and outlet tubing. The latter stop means may comprise an arm 180 carried by the piston and adapted to contact a suitable stop plate 184 in the two required positions of rotation of the piston. The stop plate 184 may be supported in any suitable fashion in operative relation with the arm 180. The slot 164 and arm 180 and stop 184 are arranged so that when the arm 180 contacts the stop in one position, the slot 164 is aligned with the inlet tube 168. When the piston is rotated until the arm 180 again contacts the stop 184, the slot 164 is aligned with the outlet tube 172. It is clear that the apparatus shown in FIGS. 6 and 7 may be operated successfully by hand without stop 184 being required.

In operation of this embodiment of the invention, first, the piston 160 is rotated so that the slot 164 therein is aligned with the inlet tube 168. When this alignment is achieved, fluid from the reservoir (not shown) enters the slot, fills the slot, and forces the piston upwardly to meet the vertical stop member. Air which may have been trapped in the inlet tube is held beneath the raised piston and in the slot in the piston. The piston is then rotated so that the slot 164 is in alignment with the outlet tube 172, and the piston is moved downwardly so that the air and fluid retained in the syringe is discharged through the outlet tube. This operation generally removes air from the system on the first cycle of operation. However, if all air is not removed the first time, another cycle filling and discharge may be carried out to effect the removal of the air. After the air has been removed, the apparatus is ready for the dispensing of an exact measured quantity of fluid. This operation is effected, as described above, by rotating the piston 160 so that the slot 164 is in alignment first with the inlet tube to fill the syringe and then rotated into alignment with the outlet tube 172 to discharge the desired quantity of fluid.

The apparatus of the invention has many advantages, among which are the following. First, the apparatus may be made entirely of glass, with the advantage that corrosive liquids may be accurately and rapidly metered thereby without splashing and foaming. Secondly, the apparatus has all of the advantages of the hypodermic syringe and none of the disadvantages. For example, filling of the syringe from the reservoir is rapid, and dispensing from the syringe is also rapid. The syringe may be vented quickly and easily and just once so that exact quantities of fluid may be dispensed. And since the dispensing flow is substantially free flow, it is accomplished with no turbulence or agitation of the dispensed fluid.

It is clear that modifications may be made in the specific structures shown and described within the scope of the invention. For example, although the venting grooves are shown as being straight, it is clear that they could be curved as desired and still perform the required function.

What is claimed is:

1. Liquid-dispensing apparatus including a syringe comprising a barrel and a piston slidable therein,
   a source of liquid to be dispensed,
   an inlet tube coupled between said source and said syringe,
   an outlet tube coupled to said syringe,
   said inlet and outlet tubes being horizontally aligned,
   a longitudinal groove in said piston having an upper end and a lower end,
   the upper end of said groove being aligned with said inlet and outlet tubes when said piston is completely inserted in said barrel,
   said piston being adapted to be rotated so that said groove communicates at one time with said inlet tube whereby the syringe is filled with liquid to be dispensed and at another time with said outlet tube whereby the liquid in the syringe is discharged.

2. Liquid-dispensing apparatus including
   a syringe which comprises a barrel and a piston freely slidable in the barrel,
   said piston being slidable to admit and emit liquid from said barrel,
   liquid inlet means and outlet means coupled to said syringe,
   said liquid inlet means adapted to be connected to a source of liquid to be admitted to said barrel and then dispensed from said barrel,
   said piston having one end outside said barrel adapted to engage stop means to limit its movement and thereby to limit the quantity of liquid which can flow into said barrel from said source,
   gas venting means in said syringe for venting gas therefrom so that an accurately measured gas-free quantity of liquid may be admitted to said barrel and dispensed therefrom,
   said gas venting means being positioned substantially completely inside said barrel during normal operation of the gas venting means and during normal operation of the syringe so that gas can be vented from said barrel without completely removing said piston, and
   means coupled to said barrel for selectively connecting said barrel to said liquid inlet means and to said liquid outlet means, the connection to said liquid inlet means allowing liquid to flow from said source into said barrel to displace said piston until the piston strikes said stop means and stops its vertical movement and thus prevents any additional flow of liquid into said barrel, a measured quantity of liquid thus being provided in said barrel, the connection to said outlet means allowing the dispensing of the measured quantity of liquid, the piston sliding in the barrel as the liquid is dispensed and thus applying a dispensing force thereto.

3. The apparatus defined in claim 2 wherein said venting means includes a groove in the piston of said syringe and extending vertically from the lower end of said piston and terminating a considerable distance below the upper end of said piston.

4. The apparatus defined in claim 2 wherein said gas venting means includes a longitudinal groove formed in the inner wall of said barrel and extending downwardly from the upper end of said barrel.

5. The apparatus defined in claim 2 wherein said gas venting means includes a longitudinal groove formed in the inner wall of said barrel and extending downwardly from the upper end of said barrel,
   said groove extending from the upper end of said barrel and terminating short of the lower end of said barrel.

6. Liquid-dispensing apparatus including
   a syringe which comprises a barrel and a piston freely slidable in the barrel,
   said piston being slidable to admit liquid to said barrel from a source and to emit liquid from said barrel,
   an inlet conduit secured to said barrel and adapted to be coupled to a source of liquid to be admitted to said barrel and then dispensed, and an outlet conduit secured to said barrel for dispensing liquid therefrom,
   gas venting means in said syringe for venting gas therefrom so that an accurately measured gas-free quantity of liquid may be admitted to said barrel and dispensed therefrom,
   said gas venting means comprising a groove formed in the surface of said piston and communicating with the end of said piston which is inside said barrel and is in contact with liquid present in said barrel, with any gas which might be present positioned adjacent to said end of said piston, said groove also being adapted to be brought into communication with the atmosphere surrounding said syringe without removing the piston from the barrel, without dispensing liquid and without exposing the user of the apparatus to the liquid in the barrel.

7. The apparatus defined in claim 6 wherein said venting groove is in the surface of said piston and extends vertically from the lower end of said piston and terminates a distance below the upper end of said piston and below the upper end of said barrel when the piston is completely inserted in the barrel.

8. The apparatus defined in claim 6 wherein said venting groove is in the surface of said piston and extends vertically from the lower end of said piston and terminates at about the vertical center of said piston.

9. The apparatus defined in claim 6 wherein said gas venting means includes a plurality of vertical grooves formed in the surface of said piston and extends vertically from a point adjacent the lower end thereof and terminates at approximately the longitudinal center of said piston.

10. Liquid-dispensing apparatus including
a syringe which comprises a barrel and a piston freely slidable in the barrel,
said piston being slidable to admit and emit liquid from said barrel,
a source of liquid to be dispensed,
a conduit coupling said source to said syringe and adapted to transmit liquid into said barrel and thereby to displace said slidable piston,
stop means in operative relation with said piston to limit its movement and thereby to limit the quantity of liquid which can flow into said barrel from said source,
gas venting means in said syringe for venting gas therefrom so that an accurately measured gas-free quantity of liquid may be admitted to said barrel and dispensed therefrom,
said gas venting means being positioned substantially completely inside said barrel during normal operation of the gas venting means and during normal operation of the syringe so that the liquid present in the barrel has no opportunity to flow out of the barrel and onto the body of the user of the apparatus during the gas venting operation, and
an enlarged cup-shaped member at the upper end of said barrel,
said cup-shaped portion facilitating the venting operation and, in addition, providing a source of lubricating liquid for said piston.

11. Liquid-dispensing apparatus including
a syringe which comprises a barrel and a piston freely slidable in the barrel,
said piston being slidable to admit liquid to said barrel from a source and to emit liquid from said barrel,
an inlet conduit secured to said barrel and adapted to be coupled to a source of liquid to be admitted to said barrel and then dispensed, and an outlet conduit secured to said barrel for dispensing liquid therefrom, and
gas venting means in said syringe for venting gas therefrom so that an accurately measured gas-free quantity of liquid may be admitted to said barrel and dispensed therefrom,
said gas venting means comprising a longitudinal groove formed in the inner wall of said barrel and extending downwardly from the upper end thereof.

12. The apparatus defined in claim 11 wherein said gas venting means includes a longitudinal groove formed in the inner wall of said barrel and extending downwardly from the upper end of said barrel, the outer surface of said piston cooperating with said groove being smooth and ungrooved.

13. The apparatus defined in claim 11 wherein said gas venting means includes a longitudinal groove formed in the inner wall of said barrel and extending downwardly from the upper end of said barrel,
said groove extending from the upper end of said barrel and terminating short of the lower end of said barrel.

14. Liquid-dispensing apparatus including a syringe comprising a barrel and a piston slidable therein,
an inlet tube secured to said barrel and adapted to be coupled to a source of liquid to be admitted to said barrel and then dispensed,
an outlet tube secured to said barrel,
a longitudinal groove in said piston which is adapted to be brought into communication with said inlet and outlet tubes separately by rotation of said piston whereby when said groove communicates with said inlet tube, the barrel is filled with liquid to be dispensed and when said groove communicates with said outlet tube, the liquid in the barrel is discharged.

15. The apparatus defined in claim 14 wherein said groove extends upwardly from the lower end of said piston inside said barrel.

16. The apparatus defined in claim 14 wherein said groove extends upwardly from the lower end of said piston inside said barrel and terminates in the vicinity of said inlet and outlet tubes as seen when the piston is completely inserted in said barrel.

17. Liquid dispensing apparatus comprising
a cylinder adapted to be oriented vertically during operation and having an open upper end and a lower end,
said lower end being adapted to be coupled to a source of liquid to be dispensed,
a piston slidably disposed within said cylinder and having an inner end inside said cylinder and an outer end extending out of said open upper end of said cylinder,
said cylinder and piston having close-fitting mating surfaces between which liquid and gas cannot normally flow, and
gas venting means in one of said surfaces,
said gas venting means extending from said inner end of said piston to a portion of said cylinder remote therefrom which communicates with the outside atmosphere whereby gas can flow from beneath the inner end of the piston to the atmosphere while the liquid beneath the inner end of this piston is held remote from said portion of said cylinder which communicates with the outside atmosphere.

18. Liquid dispensing apparatus comprising
a cylinder adapted to be oriented vertically during operation and having an open upper end and a lower end,
said lower end being adapted to be coupled to a source of liquid to be dispensed,
a piston slidably disposed within said cylinder and having an inner end inside said cylinder and an outer end extending out of said open upper end of said cylinder,
said cylinder and piston having close-fitting mating surfaces between which liquid and gas cannot normally flow, and
a gas venting groove in one of said surfaces,
said gas venting groove extending from said inner end of said piston to an opening in said cylinder which is in communication with the outside atmosphere and is remote from said inner end of said piston whereby gas can flow from beneath the inner end of the piston to the atmosphere while the liquid beneath the inner end of the piston is held remote from said opening from said cylinder to the outside atmosphere.

19. Liquid dispensing apparatus comprising
a cylinder adapted to be oriented vertically during operation and having an open upper end and a lower end,
said lower end being adapted to be coupled to a source of liquid to be dispensed, a piston slidably disposed within said cylinder and having an inner end inside said cylinder and an outer end extending out of said open upper end of said cylinder, said cylinder and piston having close-fitting mating surfaces between which liquid and gas cannot normally flow, and a gas venting groove in the surface of said piston, said gas venting groove extending upwardly from said inner end of said piston and terminating between said inner end and said upper end of said cylinder, said groove providing communication between said inner end of said piston and a portion of said cylinder which opens to the atmosphere whereby gas can flow from beneath the inner end of the piston to the atmosphere while the liquid beneath the inner end of the piston is held remote from said portion of said cylinder which opens to the outside atmosphere.

20. Liquid dispensing apparatus comprising a cylinder adapted to be oriented vertically during operation and having an open upper end and a lower end, said lower end being adapted to be coupled to a source of liquid to be dispensed, a piston slidably disposed within said cylinder and having an inner end inside said cylinder and an outer end extending out of said open upper end of said cylinder, said cylinder and piston having close-fitting mating surfaces between which fluid and gas cannot normally flow, and a gas venting groove in the surface of said cylinder which mates wtih the surface of the piston, said gas venting groove extending downwardly from said open end of said cylinder and having its termination between said upper end and lower end thereof, whereby said inner end of said piston can communicate with said termination of said groove while holding liquid beneath the piston remote from said upper open end of said cylinder and gas can flow from beneath the inner end of the piston through said groove to the atmosphere.

References Cited by the Examiner

UNITED STATES PATENTS

| | | | |
|---|---|---|---|
| 1,224,914 | 5/1917 | Field et al. | 222—387 |
| 1,665,564 | 4/1928 | Reitz | 128—234 |
| 2,057,901 | 10/1936 | Moore | 128—235 X |
| 2,711,846 | 6/1955 | Birchall et al. | 222—158 |
| 3,119,524 | 1/1964 | King et al. | 222—309 X |

LOUIS J. DEMBO, *Primary Examiner.*

S. H. TOLLBERG, *Assistant Examiner.*